(12) United States Patent
Wu et al.

(10) Patent No.: US 11,104,037 B2
(45) Date of Patent: Aug. 31, 2021

(54) METHOD FOR PREPARING HIGH PERFORMANCE POLYMER-BASED CONDUCTIVE COMPOSITES BY SPACE-LIMITED MICRO-NANO PRECISION ASSEMBLY METHOD

(71) Applicant: Beijing University of Chemical Technology, Beijing (CN)

(72) Inventors: Darning Wu, Beijing (CN); Xiaolong Gao, Beijing (CN); Ying Liu, Beijing (CN); Xiuting Zheng, Beijing (CN); Yao Huang, Beijing (CN); Hong Xu, Beijing (CN); Jingyao Sun, Beijing (CN); Zhongli Zhao, Beijing (CN)

(73) Assignee: Beijing University of Chemical Technology

( * ) Notice: Subject to any disclaimer, the term of this patent is extended or adjusted under 35 U.S.C. 154(b) by 92 days.

(21) Appl. No.: 16/483,938

(22) PCT Filed: May 26, 2017

(86) PCT No.: PCT/CN2017/086039
§ 371 (c)(1),
(2) Date: Aug. 6, 2019

(87) PCT Pub. No.: WO2018/145372
PCT Pub. Date: Aug. 16, 2018

(65) Prior Publication Data
US 2019/0389093 A1    Dec. 26, 2019

(30) Foreign Application Priority Data

Feb. 9, 2017    (CN) .......................... 201710070455.4

(51) Int. Cl.
*H01B 1/24*    (2006.01)
*B29B 7/90*    (2006.01)
(Continued)

(52) U.S. Cl.
CPC .............. *B29B 7/90* (2013.01); *B29C 43/003* (2013.01); *C08J 3/203* (2013.01); *C08K 3/04* (2013.01);
(Continued)

(58) Field of Classification Search
CPC .............. C08K 3/013; C08K 2201/001; C08K 2201/011; C08K 3/04; C08K 3/041;
(Continued)

(56) References Cited

U.S. PATENT DOCUMENTS 6,245,439 B1 *   6/2001   Yamada ............ C04B 35/62695
                                                      264/109
6,652,968 B1 *  11/2003   Miller ...................... H01B 1/22
                                                      200/265
(Continued)

OTHER PUBLICATIONS

Zhang et al., "Geometrical Confining Effects in Compression Molding of Co-continuous Polymer Blends," Annals of Biomedical Engineering, vol. 38, No. 6, Jun. 2010 pp. 1954-1964 (Year: 2010).*

*Primary Examiner* — Mark Kopec
*Assistant Examiner* — Jaison P Thomas

(57) ABSTRACT

The present invention relates to a method for preparing high performance polymer-based conductive composites by space-limited micro-nano precision assembly method, which belongs to the technical field of composite material preparation; including the following steps:
(1) through blending the conductive filler and the polymer matrix which are added to the blending equipment, homogeneous polymer/conductive filler material system is obtained;
(2) add the homogeneous material system to the mold composed of two flat plates, and let the homogeneous blend gets plane limited compression by means of mechanical compression;

(Continued)

(3) making use of the micro-nano structure array set on the compression template to further compact the filler on the network and conducting "array anchorage", to realize the micro-nano precision assembly of network and obtain the composite material with excellent performance, which has a continuous and tight conductive network, and has excellent tensile properties, flexibility and thermal stability.

9 Claims, 7 Drawing Sheets

(51) Int. Cl.
    *C08K 3/04* (2006.01)
    *B29C 43/00* (2006.01)
    *C08J 3/20* (2006.01)
    *C08K 7/06* (2006.01)
    *B29K 105/16* (2006.01)

(52) U.S. Cl.
    CPC .............. *C08K 3/041* (2017.05); *C08K 3/042* (2017.05); *C08K 7/06* (2013.01); *H01B 1/24* (2013.01); *B29K 2105/16* (2013.01); *B29K 2995/0005* (2013.01); *C08K 2201/001* (2013.01); *C08K 2201/011* (2013.01)

(58) Field of Classification Search
    CPC ........... C08K 3/042; C08K 7/06; C08L 83/04; C08L 2201/04; B29C 43/003; B29C 43/02; B29K 2105/16; B29K 2105/162; B29K 2507/04; B29K 2995/0005; C08J 3/203; H01B 1/24
    See application file for complete search history.

(56) References Cited

U.S. PATENT DOCUMENTS

| | | | |
|---|---|---|---|
| 10,829,623 B1* | 11/2020 | Van Citters | C08K 3/04 |
| 2016/0012932 A1* | 1/2016 | Holm | C08K 3/08 252/513 |
| 2016/0351288 A1* | 12/2016 | Heeder | B29C 70/62 |
| 2019/0206632 A1* | 7/2019 | Zhamu | H01G 11/66 |

* cited by examiner

METHOD FOR PREPARING HIGH PERFORMANCE POLYMER-BASED CONDUCTIVE COMPOSITES BY SPACE-LIMITED MICRO-NANO PRECISION ASSEMBLY METHOD

FIELD OF THE INVENTION

The present invention relates to a preparation method of high performance polymer-based conductive composites, and in particular to a method for preparing high performance polymer-based conductive composites by space-limited micro-nano precision assembly method, which belongs to the technical field of composite material preparation.

BACKGROUND

Polymer-based conductive composites, one of the most important functional materials, have been widely used in recent years in manufacturing anti-static, conductive or thermal requirements of electronic equipment, aircraft parts, personal computer, light emitting diode chip, electromagnetic interference shielding and sensing materials, medical equipment, intelligent biological materials, auto parts, household appliances, pipes, etc. Most of the polymer matrix itself is not conductive, so it is necessary to add conductive filler with relatively large long diameter ratio or specific surface area to the polymer matrix to form a conductive network to prepare composites that meet the conductive requirements. Common conductive filler includes carbon black particles, carbon fiber, flake graphite, carbon nanotubes and grapheme. In-situ polymerization method, solution mixing method and melt blending method are commonly used to prepare polymer-based conductive composites, among which melt blending is generally used to prepare polymer-based composites with evenly dispersed filler. Theory and practice show that form a continuous and tight conductive network is the key to the preparation of ultra-high conductivity polymer-based composites, the existing methods to improve the conductivity of composites are mainly by increasing the content of filler to reach the conductive seepage threshold and continue to add until saturated, even so, the conductivity of composites is far from the theoretical value. The main reason is that most traditional methods allow the filler to self-assemble in the matrix to form a conductive network under specific thermodynamic and hydrodynamic conditions, and the spacing of filler is uncontrollable, although the conductivity of composites can be rapidly improved by increasing the content of filler in the conductive and percolating areas, it is difficult for filler to self-assemble in the polymer matrix to form a continuous and tight conductive network due to the high viscosity of most polymer matrix and the repulsion and steric resistance between filler, which is far from the expected conductivity, especially after passing through the conductive and percolating areas, the conductivity of the composites changes little with the content of filler, so it is impossible to further improve the conductivity of the composites. The invention adopts a new technology path limited space micro-nano precision assembly to achieve the purpose of improving the properties of composite materials.

SUMMARY OF THE INVENTION

The purpose of the present invention is to provide a method for space-limited high performance polymer-based conductive composites, and the high performance polymer-based conductive composites prepared by the method has a continuous and tight conductive network, and has excellent tensile properties, flexibility and thermal stability.

In order to achieve the purpose of the invention, the technical scheme adopted by the invention is as follows:

A method for preparing high performance polymer-based conductive composites by space-limited micro-nano precision assembly method, including the following steps:
(1) through blending the conductive filler and the polymer matrix which are added to the blending equipment in the proportion of mass ratio of (0.5~60):100, homogeneous polymer/conductive filler material system is obtained;
(2) add the homogeneous material system prepared in step (1) to the mold composed of two flat plates, and let the homogeneous blend gets plane limited compression by means of mechanical compression;
(3) making use of the micro-nano structure array set on the compression template to further compact the filler on the network and conducting "array anchorage", to realize the micro-nano precision assembly of network and obtain the composite material with excellent performance.

The conductive filler in step (1) is one or more combination of sheet filler, fibrous filler and spherical conductive filler at micro-nano scale. The sheet filler is one or more combination of flake graphite or grapheme; the fibrous filler is one or more combination of carbon fiber, carbon nanotubes or carbon nanofibers; the spherical conductive filler is one or more combination of carbon black particles, silver powder or magnesium oxide and one or more combination of sheet filler, fibrous filler or spherical filler.

The polymer matrix in step (1) is thermoplastic polymer matrix, thermosetting matrix or light curing type matrix. The thermoplastic polymer matrix is one or more combination of polypropylene, nylon, polycarbonate or polymethyl methacrylate; the thermosetting matrix is phenolic resin, polydimethylsiloxane or epoxy resin; the light curing type matrix is epoxy acrylic ester, polyurethane acrylic ester and polyester acrylic resin.

The blending equipment in step (1) includes high speed agitator, ultrasonic dispersing apparatus, mixer, coaxial twin-screw extruder, buss extruder or planetary extruder.

The mechanical compression in step (2) includes flat plate compression, crawler compression or roller compression.

The plane limited compression in step (2), the homogeneous system is firstly self-assembled into a network in the traditional way, then blend is further compressed to the specified characteristic thickness, during the thickness formation process, the filler on self-assembly network is further compacted until the spacing of the filler is reduced to the design value, the network density increases significantly.

The micro-nano structure array in step (3) is one or more combination of V-Cut structure, semi-spherical structure, semi-cylindrical structure, prism structure, pyramid structure, pyramid structure or semi-elliptic sphere structure.

The thickness of the composite material in step (3) is that through mechanical compression of homogeneous samples to make its thickness close to or less than the characteristic thickness in the self-assembly process of the network, and the characteristic thickness depends on the average diameter of the network wire composed of the filler.

The advantageous effects of the invention are
(1) homogeneous polymer/conductive filler material system is obtained by blending with high speed agitator, mixer or twin-screw extruder, and then let the homogeneous blend gets plane limited compression by means of mechanical compression under certain thermodynamic conditions. During the compression process, the homogeneous system is firstly self-assembled into a network in the traditional way, then blend is further compressed to the specified characteristic thickness, during the thickness formation process, the filler on self-assembly network is further compacted until the spacing of the filler is reduced to the design value, the network density increases significantly.

(2) In the later stage of the compression process, through the micro-nano structure array set on the compression template to make the filler on the network get "array anchorage", and complete the micro-nano precision assembly of network finally. A continuous and tight conductive network which is forced to be assembled and the composite material with excellent electrical conductivity can be obtained through the two steps.

(3) The filler in the composite materials prepared by the invention forms a continuous and tight conductive network, and the gaps between the filler become smaller, especially at the anchorage point, the spacing of the filler is smaller, and the composite materials can obtain high conductivity under the condition of low concentration of the conductive filler. The method can also be used to prepare polymer matrix composites with high thermal conductivity and high strength. The prepared Polymer-based conductive composite materials can be used in anti-static, electromagnetic interference shielding, wearable electronic devices, curved displays, flexible electronic components, intelligent biological materials and so on.

DESCRIPTION OF THE EMBODIMENTS

The present invention is further described in conjunction with the following embodiments, which are used only to illustrate the invention and do not limit the scope of the invention.

Embodiment 1

Figure 1:
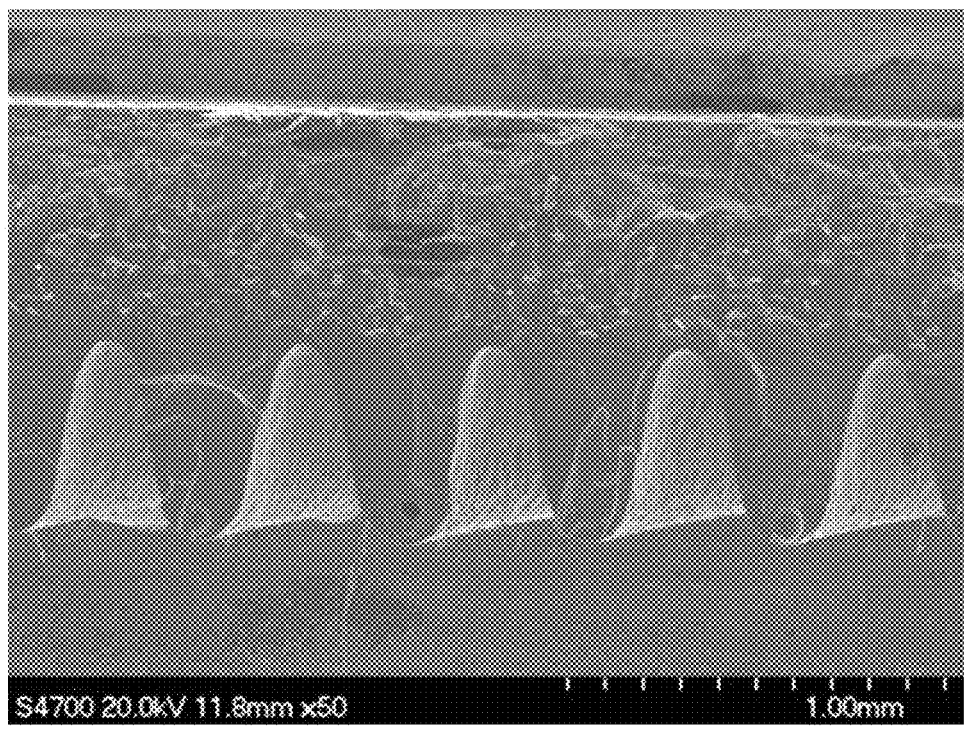
FIG. 1 geometric dimensions and arrangement micrographs of V-Cut microarray on the plate.
Figure 5:
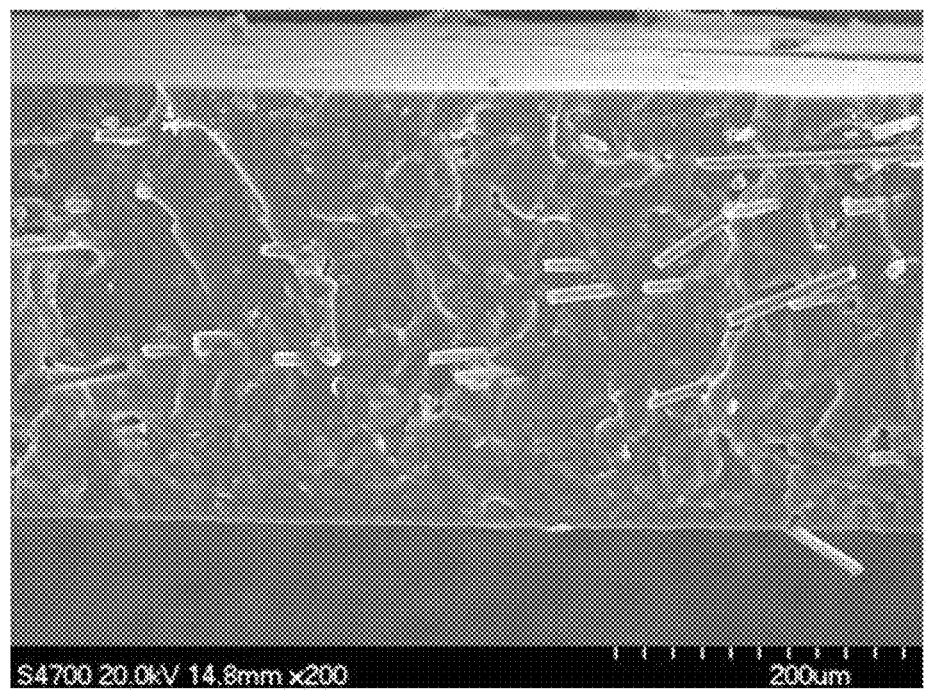
FIG. 5 section sem image of polydimethylsiloxane/0.5 wt % carbon fiber composites prepared by embodiment 1.

The mixed materials of polydimethylsiloxane/carbon fiber with the carbon fiber concentration of 0.5 wt % are prepared and mixed in the haq mixer. The mixer parameters are as follows: the screw speed is 50 r/min and the mixer temperature is 30° C. for 15 min. Mix the mixed materials and PDMS curing agent in a ratio of 10:1 and then put them into a vacuum drying box to vacuum for 10 minutes to remove bubbles in the materials. PDMS curing agent is octamethylcyclotetrasiloxane, and both PDMS and curing agent are produced by Dow Coming. The geometric dimension of carbon fiber is 7 um in diameter and 4 mm in length. Then, material of homogeneous system is added into the plate mold, and the material is compressed to a set thickness of 200 um with a pressure of 5 Mpa by a molding press. After heating the mold to 100-130° C. and curing for 10 minutes, the composite material can be obtained. The geometric mechanism and dimensions of one of the raised microstructure array on the flat plate are shown in FIG. 1. FIG. 5 is a sem image of the cross section of the composites prepared by embodiment 1. The test conductivity of the composite materials in embodiment 1 is 0.036 s/m.

Embodiment 2

Figure 6:
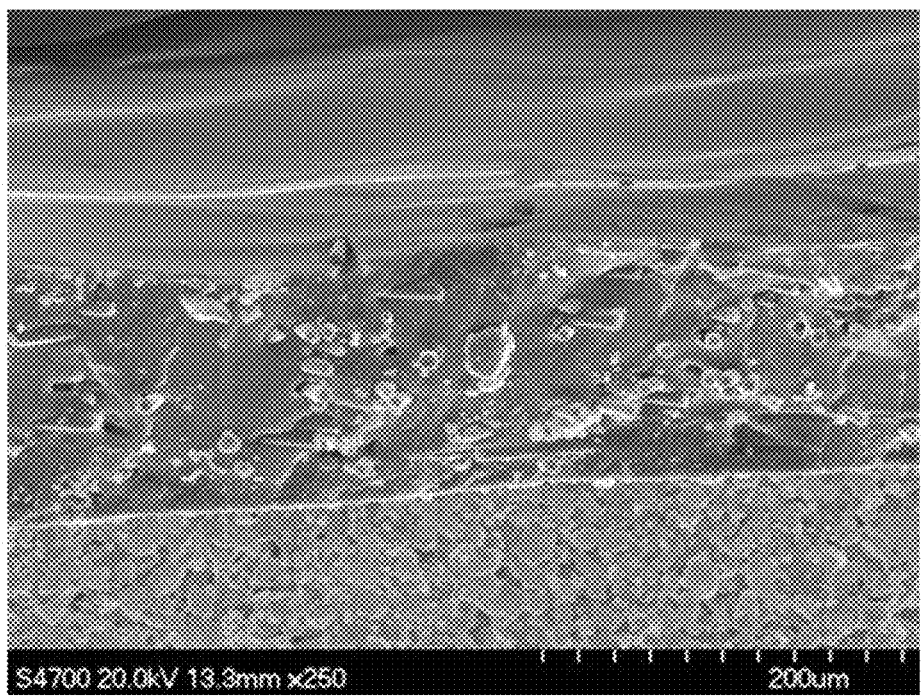
FIG. 6 section sem image of polydimethylsiloxane/4 wt % carbon fiber composites prepared by embodiment 2.

The mixed materials of polydimethylsiloxane/carbon fiber with the carbon fiber concentration of 4 wt % are prepared and mixed in the haq mixer. The mixer parameters are as follows: the screw speed is 50 r/min and the mixer temperature is 30° C. for 15 min. Mix the mixed materials and PDMS curing agent in a ratio of 10:1 and then put them into a vacuum drying box to vacuum for 10 minutes to remove bubbles in the materials. PDMS curing agent is octamethylcyclotetrasiloxane, and both PDMS and curing agent are produced by Dow Coming. The geometric dimension of carbon fiber is 7 um in diameter and 4 mm in length. Then, material of homogeneous system is added into the plate mold, and the material is compressed to a set thickness of 200 um with a pressure of 5 Mpa by a molding press. After heating the mold to 100-130° C. and curing for 10 minutes, the composite material can be obtained. The geometric mechanism and dimensions of one of the raised microstructure array on the flat plate are shown in FIG. 1. FIG. 6 is a sem image of the cross section of the composites prepared by embodiment 2. The test conductivity of the composite materials in embodiment 2 is 95.2 s/m.

Embodiment 3

Figure 7:
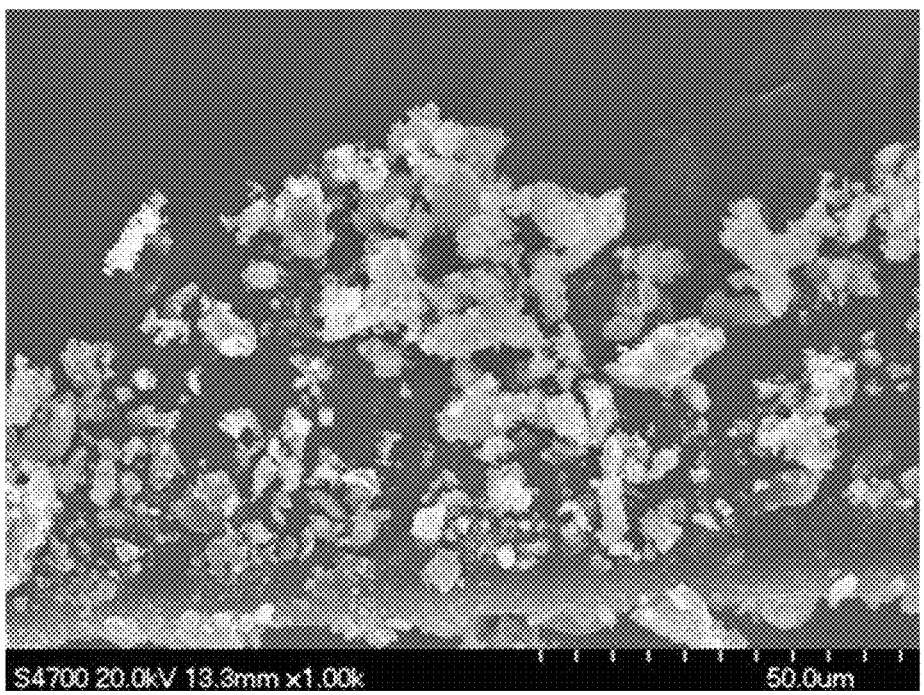
FIG. 7 section sem image of polydimethylsiloxane/4 wt % carbon black composites prepared by embodiment 3.

The mixed materials of polydimethylsiloxane/carbon black with the carbon black concentration of 4 wt % are prepared and mixed in the haq mixer. The mixer parameters are as follows: the screw speed is 50 r/min and the mixer temperature is 30° C. for 15 min. Mix the mixed materials and PDMS curing agent in a ratio of 10:1 and then put them into a vacuum drying box to vacuum for 10 minutes to remove bubbles in the materials. PDMS curing agent is octamethylcyclotetrasiloxane, and both PDMS and curing agent are produced by Dow Coming. Carbon black is produced by ORION ENGINEERED CARBONS, the model is: XE2-B. Then, material of homogeneous system is added into the plate mold, and the material is compressed to a set thickness of 200 um with a pressure of 5 Mpa by a molding press. After heating the mold to 100-130'° C. and curing for 10 minutes, the composite material can be obtained. The geometric mechanism and dimensions of one of the raised microstructure array on the flat plate are shown in FIG. 1. FIG. 7 is a sem image of the cross section of the composites prepared by embodiment 3. The test conductivity of the composite materials in embodiment 3 is 182 s/m.

Embodiment 4

Figure 8:
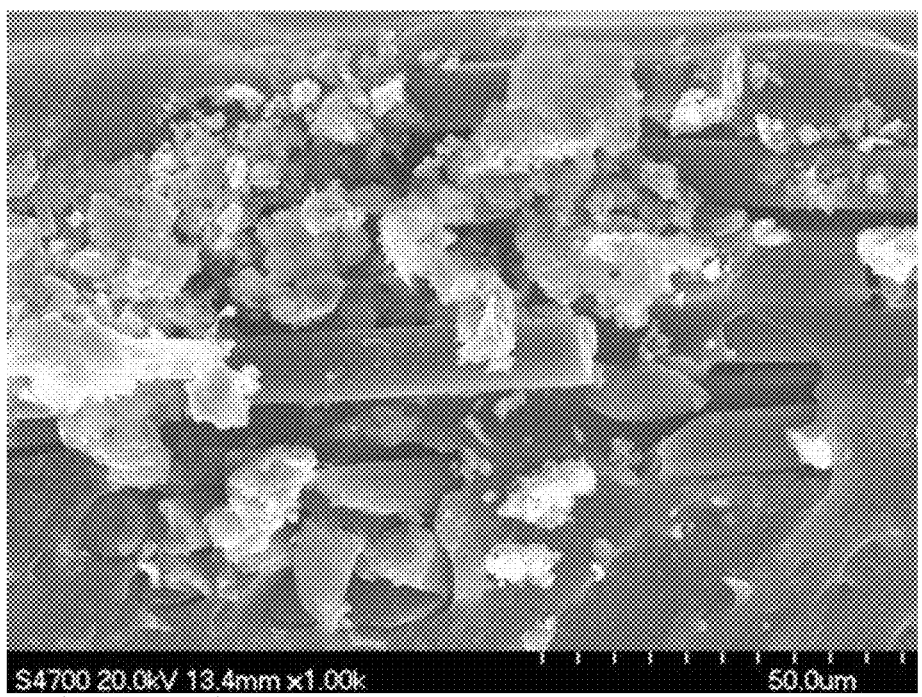
FIG. 8 section sem image of polydimethylsiloxane/3 wt % carbon fiber+1 wt % carbon black composites prepared by embodiment 4.

The mixed materials of polydimethylsiloxane/carbon fiber+carbon black with the carbon fiber concentration of 3 wt % and the carbon black concentration of 3 wt % are prepared and mixed in the hag mixer. The mixer parameters are as follows: the screw speed is 50 r/min and the mixer temperature is 30° C. for 15 min. Mix the mixed materials and PDMS curing agent in a ratio of 10:1 and then put them into a vacuum drying box to vacuum for 10 minutes to remove bubbles in the materials. PDMS curing agent is octamethylcyclotetrasiloxane, and both PDMS and curing agent are produced by Dow Coming. The geometric dimension of carbon fiber is 7 um in diameter and 4 mm in length, and carbon black is produced by ORION ENGINEERED CARBONS, the model is: XE2-B. Then, material of homogeneous system is added into the plate mold, and the material is compressed to a set thickness of 200 um with a pressure of 5 Mpa by a molding press. After heating the mold to 100-130° C. and curing for 10 minutes, the composite material can be obtained. The geometric mechanism and dimensions of one of the raised microstructure array on the flat plate are shown in FIG. 1. FIG. 8 is a sem image of the cross section of the composites prepared by embodiment 4. The test conductivity of the composite materials in embodiment 4 is 910 s/m.

Embodiment 5

Figure 2:
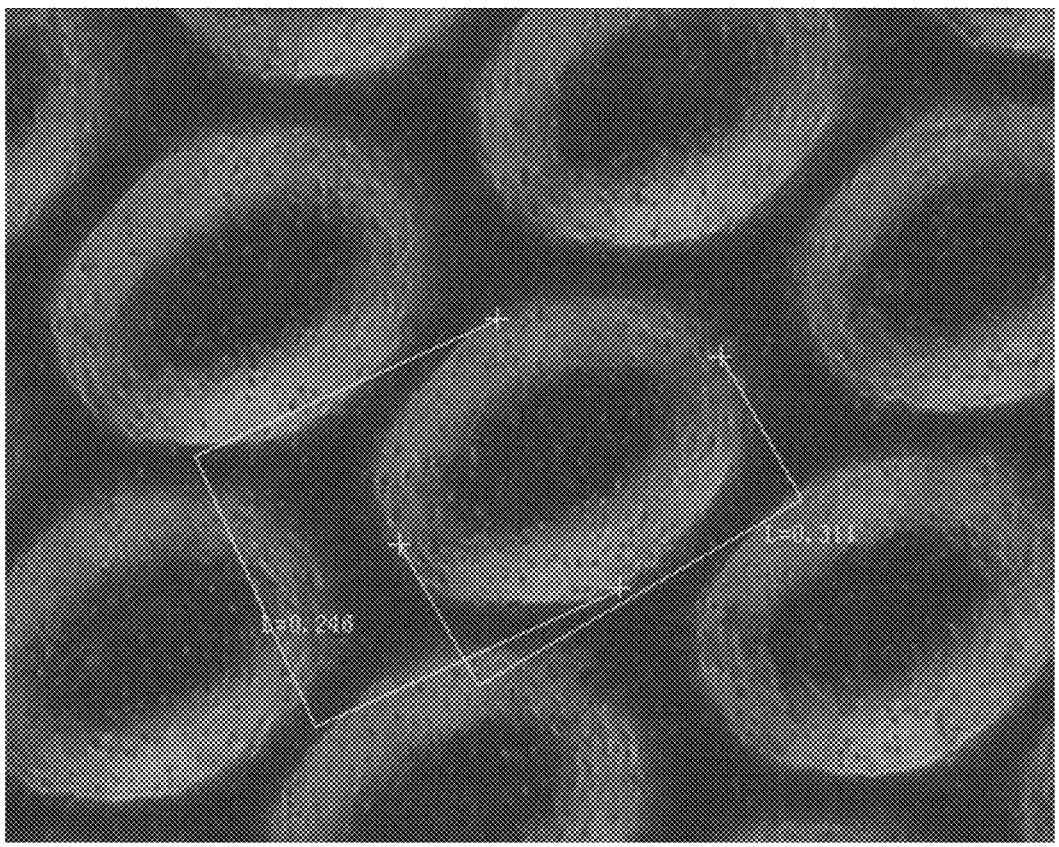
FIG. 2 geometric dimensions and arrangement micrographs of semi-elliptic spherical microarray on the plate.
Figure 3:
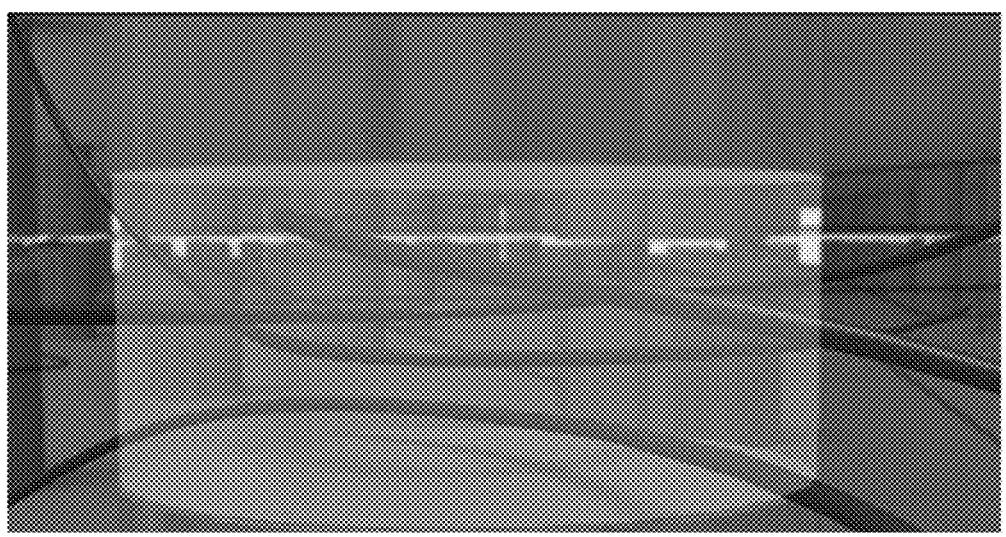
FIG. 3 schematic diagram of anchoring effect of the raised microstructure array on the plate.
Figure 4:
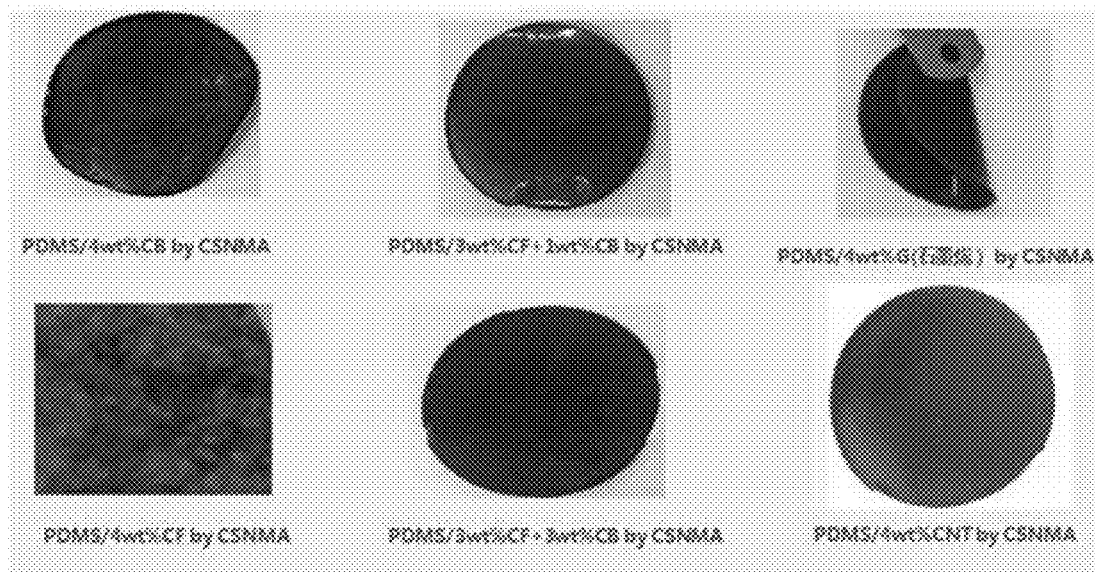
FIG. 4 physical drawings of some samples of composite materials prepared in the experiment.
Figure 9:
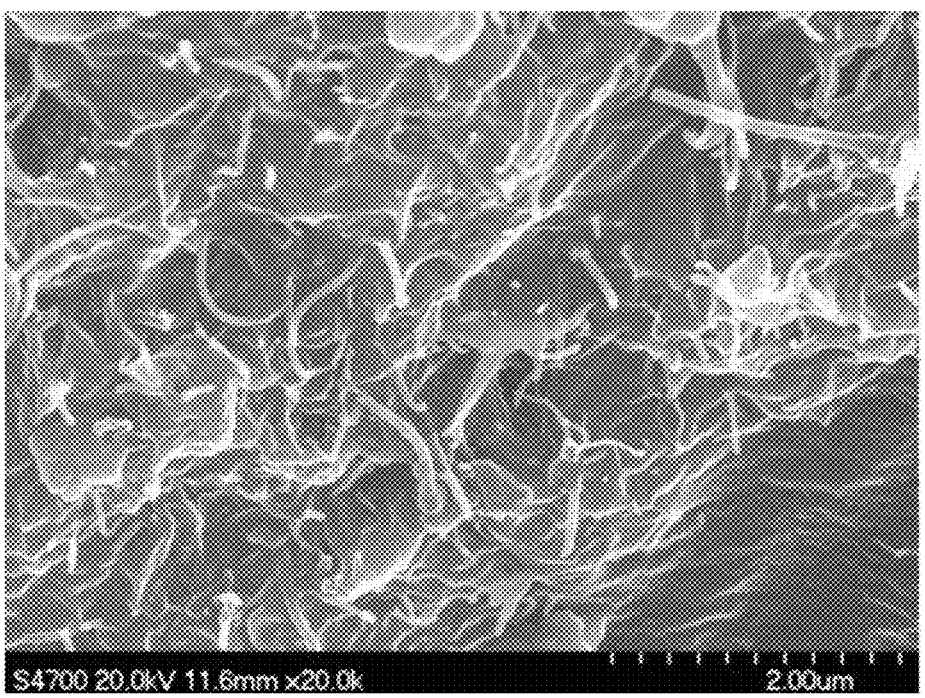
FIG. 9 section sem image of polydimethylsiloxane/3 wt % carbon fiber+1 wt % carbon nanotube composites prepared by embodiment 5.

The mixed materials of polydimethylsiloxane/carbon fiber+carbon nanotubes with the carbon fiber concentration of 3 wt % and the carbon nanotubes concentration of 1 wt % are prepared and mixed in the haq mixer. The mixer parameters are as follows: the screw speed is 50 r/min and the mixer temperature is 30° C. for 15 min. Mix the mixed materials and PDMS curing agent in a ratio of 10:1 and then put them into a vacuum drying box to vacuum for 10 minutes to remove bubbles in the materials. PDMS curing agent is octamethylcyclotetrasiloxane, and both PDMS and curing agent are produced by Dow Corning. The geometric dimension of carbon fiber is 7 um in diameter and 4 mm in length, and the geometric dimension of carbon nanotubes is 20-30 nm in diameter and 10-30 um in length, whose conductivity is greater than 10000 s/m, produced by Beijing Dejin island. Then, material of homogeneous system is added into the plate mold, and the material is compressed to a set thickness of 200 um with a pressure of 5 Mpa by a molding press. After heating the mold to 100-130° C. and curing for 10 minutes, the composite material can be obtained. The geometric mechanism and dimensions of one of the raised microstructure array on the flat plate are shown in FIG. 2. FIG. 9 is a sem image of the cross section of the composites prepared by embodiment 5. The test conductivity of the composite materials in embodiment 5 is 727 s/m.

Embodiment 6

Figure 10:
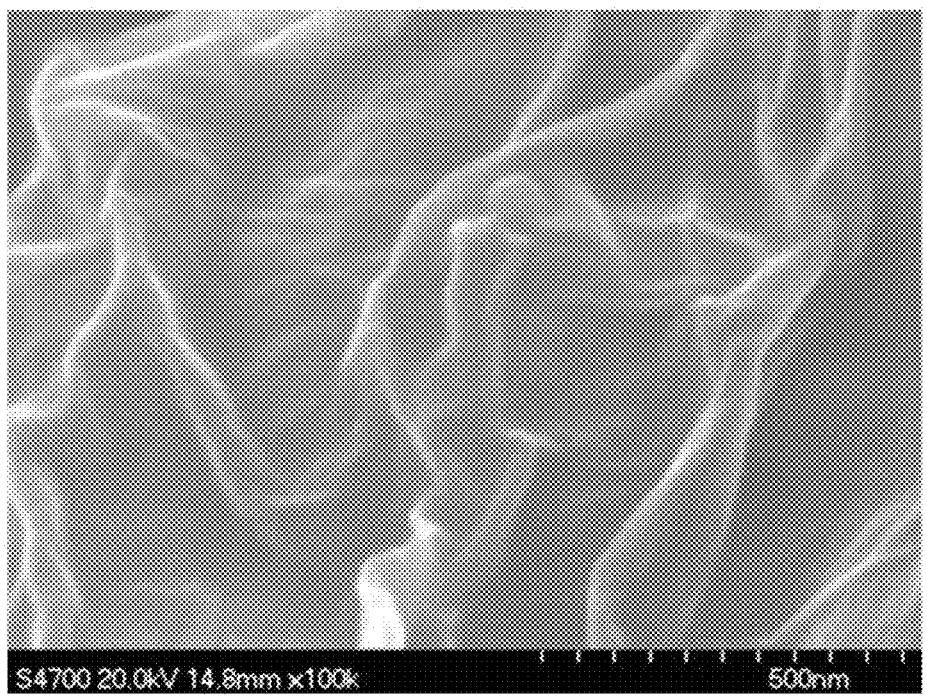
FIG. 10 section sem image of polydimethylsiloxane/3 wt % carbon fiber+1 wt % graphene composites prepared by embodiment 6.

The mixed materials of polydimethylsiloxane/carbon fiber+graphene with the carbon fiber concentration of 3 wt % and the graphene concentration of 1 wt % are prepared and mixed in the haq mixer. The mixer parameters are as follows: the screw speed is 50 r/min and the mixer temperature is 30° C. for 15 min. Mix the mixed materials and PDMS curing agent in a ratio of 10:1 and then put them into a vacuum drying box to vacuum for 10 minutes to remove bubbles in the materials. PDMS curing agent is octamethylcyclotetrasiloxane, and both PDMS and curing agent are produced by Dow Corning. The geometric dimension of carbon fiber is 7 um in diameter and 4 mm in length. Graphene is a single-layer graphene powder with geometric dimensions of 1.0-1.77 nm in thickness and layer diameter of 10-50 um, produced by Suzhou Hengqiu technology co., LTD. Then, material of homogeneous system is added into the plate mold, and the material is compressed to a set thickness of 200 um with a pressure of 5 Mpa by a molding press. After heating the mold to 100-130° C. and curing for 10 minutes, the composite material can be obtained. The geometric mechanism and dimensions of one of the raised microstructure array on the flat plate are shown in FIG. 2. FIG. 10 is a sem image of the cross section of the composites prepared by embodiment 6. The test conductivity of the composite materials in embodiment 6 is 97.7 s/m.

Embodiment 7

Figure 11:
FIG. 11 transmission scanning electron microscope image of polypropylene/5 wt % carbon fiber composites prepared by embodiment 7.

The mixed materials of polypropylene/carbon fiber with the carbon fiber concentration of 5 wt % are prepared and mixed in the haq mixer. The mixer parameters are as follows: the screw speed is 100 r/min and the mixer temperature is 170° C. for 15 min. Mix the mixed materials and PDMS curing agent in a ratio of 10:1 and then put them into a vacuum drying box to vacuum for 10 minutes to remove bubbles in the materials. PDMS curing agent is octamethylcyclotetrasiloxane, and both PDMS and curing agent are produced by Dow Coming. The geometric dimension of carbon fiber is 7 um in diameter and 4 mm in length, and carbon black is produced by ORION ENGINEERED CARBONS, the model is: XE2-B. Then, material of homogeneous system is added into the plate mold, and the material is compressed to a set thickness of 200 um with a pressure of 5 Mpa by a molding press. After heating the mold to 100-130° C. and curing for 10 minutes, the composite material can be obtained. The geometric mechanism and dimensions of one of the raised microstructure array on the flat plate are shown in FIG. 2. FIG. 11 is a sem image of the cross section of the composites prepared by embodiment 7. The test conductivity of the composite materials in embodiment 7 is 0.11 s/m.

Embodiment 8

The mixed materials of polydimethylsiloxane/carbon fiber with the carbon fiber concentration of 60 wt % are prepared and mixed in the haq mixer. The mixer parameters are as follows: the screw speed is 50 r/min and the mixer temperature is 30° C. for 15 min. Mix the mixed materials and PDMS curing agent in a ratio of 10:1 and then put them into a vacuum drying box to vacuum for 10 minutes to remove bubbles in the materials. PDMS curing agent is octamethylcyclotetrasiloxane, and both PDMS and curing agent are produced by Dow Coming. The geometric dimension of carbon fiber is 7 um in diameter and 4 mm in length. Then, material of homogeneous system is added into the plate mold, and the material is compressed to a set thickness of 200 um with a pressure of 5 Mpa by a molding press. After heating the mold to 100-130° C. and curing for 10 minutes, the composite material can be obtained. The geometric mechanism and dimensions of one of the raised microstructure array on the flat plate are shown in FIG. 1.

Figure 12:
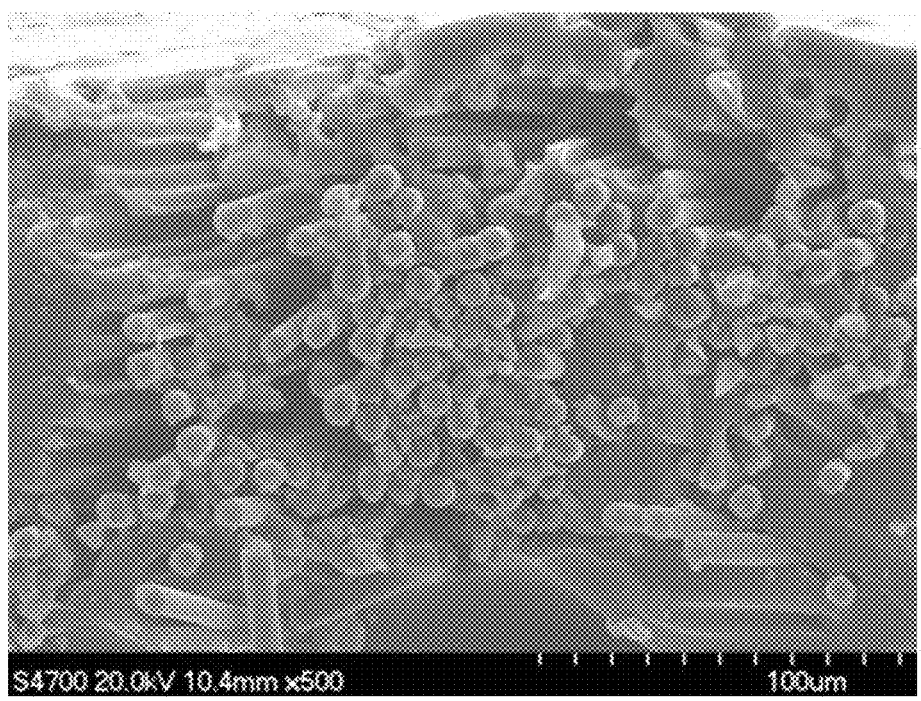
FIG. 12 section sem image of polydimethylsiloxane/60 wt % carbon fiber composites prepared by embodiment 8.

FIG. 12 is a sem image of the cross section of the composites prepared by embodiment 8. The test conductivity of the composite materials in embodiment 8 is 2650 s/m.

What is claimed is:

1. A method for preparing high performance polymer-based conductive composites by space-limited micro-nano precision assembly method is characterized by including the following steps:
    (1) obtaining homogeneous filler material system by blending conductive filler and polymer matrix in a blending equipment in the proportion of mass ratio of 0.5~60:100;
    (2) adding the homogeneous material system prepared in step (1) to a mold comprising of two flat plates, and apply plane limited compression by means of mechanical compression;
    (3) using micro-nano structure array to further compact the filler on a network and conducting array anchorage, to obtain realize the micro-nano precision assembly of network.

2. The method for preparing high performance polymer-based conductive composites by space-limited micro-nano precision assembly method according to claim 1, wherein the conductive filler in step (1) comprising at least one of sheet filler, fibrous filler and spherical conductive filler at micro-nano scale.

3. The method for preparing high performance polymer-based conductive composites by space-limited micro-nano precision assembly method according to claim 2, wherein the sheet filler comprising at least one of flake graphite and grapheme; the fibrous filler comprising at least one of carbon fiber, carbon nanotubes and carbon nanofibers; the spherical conductive filler comprising at least one of carbon black particles, silver powder or magnesium oxide, sheet filler, fibrous filler and spherical filler.

4. The method for preparing high performance polymer-based conductive composites by space-limited micro-nano precision assembly method according to claim 1, wherein the polymer matrix in step (1) is thermoplastic polymer matrix, thermosetting matrix or light curing type matrix.

5. The method for preparing high performance polymer-based conductive composites by space-limited micro-nano precision assembly method according to claim 4, wherein the thermoplastic polymer matrix comprising at least one of polypropylene, nylon, polycarbonate and polymethyl methacrylate; the thermosetting matrix is phenolic resin, polydimethylsiloxane or epoxy resin; the light curing type matrix is epoxy acrylic ester, polyurethane acrylic ester and polyester acrylic resin.

6. The method for preparing high performance polymer-based conductive composites by space-limited micro-nano precision assembly method according to claim 1, wherein the blending equipment in step (1) includes high speed agitator, ultrasonic dispersing apparatus, mixer, coaxial twin-screw extruder, Buss extruder or planetary extruder.

7. The method for preparing high performance polymer-based conductive composites by space-limited micro-nano precision assembly method according to claim 1, wherein the mechanical compression in step (2) includes flat plate compression, crawler compression or roller compression.

8. The method for preparing high performance polymer-based conductive composites by space-limited micro-nano precision assembly method according to claim 1, wherein during the plane limited compression in step (2), the homogeneous system is first self-assembled into a network, then the blend is further compressed to a specified characteristic thickness and, during the thickness formation process, the filler on a self-assembly-network is further compacted until the spacing of the filler is reduced to a design value and the network density increases.

9. The method for preparing high performance polymer-based conductive composites by space-limited micro-nano precision assembly method according to claim 1, wherein the micro-nano structure array in step (3) comprising at least one of V-Cut structure, semi-spherical structure, semi-cylindrical structure, prism structure, pyramid structure, and semi-elliptic sphere structure.

* * * * *